Jan. 27, 1970   J. HEIMGARTNER   3,492,383
PROCESS OF MANUFACTURING A CRACK RESISTANT
MULTI-LAYER FURNACE LINING
Filed May 7, 1968                                 4 Sheets-Sheet 1

Inventor:
JULIUS HEIMGARTNER
BY
Kenyon & Kenyon
ATTORNEYS

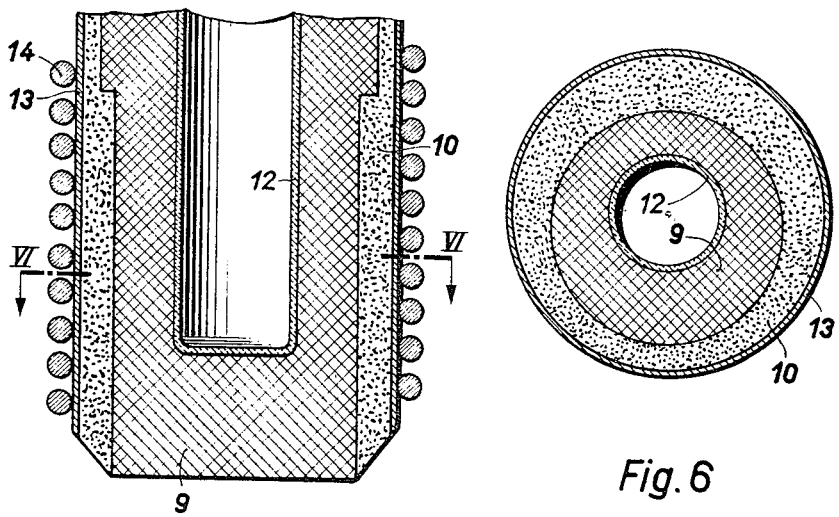
Fig. 5
Fig. 6
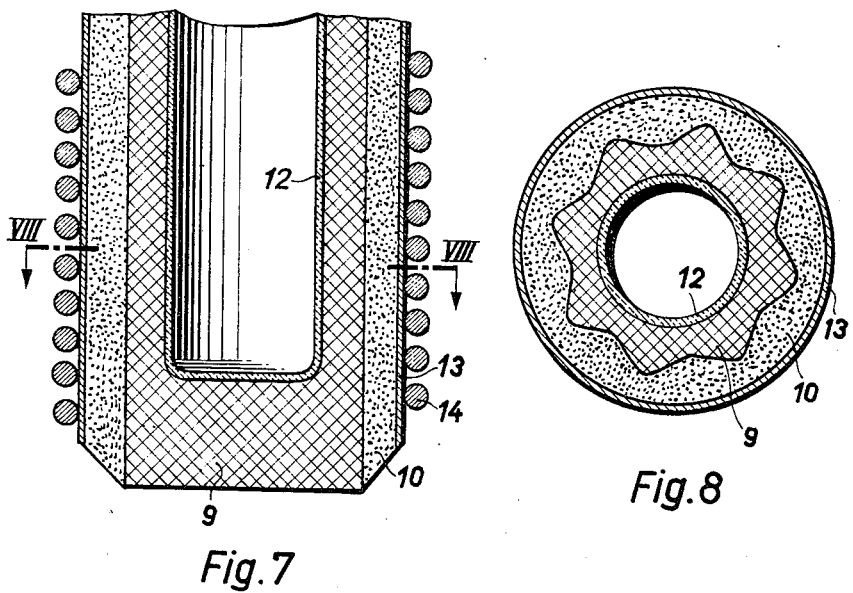
Fig. 7
Fig. 8

United States Patent Office 3,492,383
Patented Jan. 27, 1970

3,492,383
PROCESS OF MANUFACTURING A CRACK RESISTANT MULTI-LAYER FURNACE LINING
Julius Heimgartner, Sulz-Attikon, Zurich, Switzerland, assignor to Sulzer Brothers, Ltd., Winterthur, Switzerland, a corporation of Switzerland
Filed May 7, 1968, Ser. No. 727,254
Claims priority, application Switzerland, May 12, 1967, 6,788/67
Int. Cl. F27d 1/16; E04b 1/16
U.S. Cl. 264—30   6 Claims

ABSTRACT OF THE DISCLOSURE

A process of manufacturing a multi-layer refractory lining for a melting furnace from loose granular refractory materials wherein the working or contact lining is built up of a refractory material having a lower refractoriness than the refractory material used to build up the backing lining so that when the furnace is heated to operating temperatures the working or contact lining sinters into a monolithic rigid lining while the back up lining remains in loose granular form containing no bonds between the refractory grains.

---

This invention relates to a process for manufacturing a melting vessel or furnace lining. More particularly, this invention relates to a process for the manufacture of a multi-layered lining of granular refractory material for melting vessels and furnaces and the lining made thereby.

It has been known to manufacture a lining for melting vessels and furnaces from loose granular material wherein the actual configuration of the crucible is brought about by the use of a mold forming the "negative" of the crucible configuration. In many cases, the loose granular material after being poured around a mold has been compacted in situ, for example, by means of tamping, shaking or vibrating. Thereafter, in some instances, the mold has been withdrawn to produce a hollow crucible space for a charge provided a binding agent has been previously admixed to the loose lining material or the lining material has had a fusion or gasification temperature higher than the sintering temperature of the crucible. In other instances, the mold has been fused in with the first melt in the crucible and thereafter made anew for each lining subsequently made.

It has also been known that many lining materials, e.g. foundry lime and pure magnesium oxide, which can have a positive effect on the quality of a melt present the disadvantage of cracking upon cooling. The reason for this being that these materials exhibit high thermal expansion and, in addition, unfavorable sintering characteristics.

Cracks in the lining of a furnace cause serious disadvantages with melting plants that are operated at frequent intermittent rates. This is due to the fact that such cracks will only close slowly upon heating up of the furnace during the melting of a new charge because the temperature of the lining, on account of its relatively poor conduction of heat, is substantially below that of the charge. In such instances, one can frequently note, especially in the case of induction furnaces with high specific outputs, that a substantial part of the charge has already liquefied during the melting period before the lining cracks have had a chance to close. The melt thus penetrates into the cracks with the consequent risk of a breakthrough to the induction coil of the furnace.

Another disadvantage of such linings is the high cost of the loose material. The costs are increased even further because such linings must frequently be knocked out on account of cracks after hardly one-half of their wall thickness has been used up.

Accordingly, it is an object of the invention to produce a crucible lining which is insensitive to cracking under thermal stress.

It is another object of the invention to reduce the cost of lining material per lining.

It is another object of the invention to produce a multi-layer lining in a simple manner with relatively inexpensive materials.

Briefly, the invention provides a process of manufacturing a lining wherein the lining is formed of at least two different layers. The lining is made from material which is poured into and compacted within spaces between a negative mold in the melting space and suitably shaped separator walls outside the negative mold. In addition, the lining is made such that the innermost layer is consolidated by a subsequent sintering step while the other outer layers remain in a flowable state at the operating temperatures of the lining. The layer of layers which remain flowable and are hereinafter referred to as a cushion layer effectively prevents any breakthrough of the melt metal.

The separator walls which are used in the manufacture of the lining are preferably in the form of adjustable elements and serve to separate the layers of material from each other during manufacture. In building the lining the materials for the respective layers are first poured to partially fill the respective spaces then compacted in a sequence of steps. After each compaction of the materials, the separator walls are adjusted and more material is poured into the respective spaces and compacted. In another embodiment, the separator walls are made in the form of hollow bodies and left in the lining. The materials for the respective lining layers are then poured and compacted in the above manner.

Also, the layers of material of the lining can be filled and compacted simultaneously such that the time required for the manufacture of the crucible is markedly reduced.

The materials used for the innermost layer, hereinafter referred to as the contact layer, and the cushion layer are, in one embodiment, of the same base materials with a sintering agent such as SiAl ester, fluorite or boric acid being added to the contact layer. A binding agent such as clay, water glass, cement or tar can also be added to the contact layer to impart an initial degree of rigidity to the contact layer so as to allow the negative mold to be removed prior to sintering. Usually, these binding agents act simultaneously as sintering agents.

In order to achieve very pure melts, it is frequently not acceptable to admix a sintering and/or binding agent to the contact layer nor to melt in a negative mold consisting of extraneous material. In such cases, a pre-fabricated crucible can be used as a negative mold according to the invention. As a rule, such a crucible consists of highly pure ceramic material and, to reduce the formation of cracks, is generally designed to be thin-walled or of several parts. In both cases, the crucible is additionally enclosed by a sintered contact layer of identical material. On the other hand, the cushion layer preferably consists of a comparatively cheap material, e.g. quartz or magnesium oxide, especially if the contact layer consists of a comparatively expensive material. If the two layers are made of different materials, two preferable substances, e.g. aluminum oxide for the contact layer and quartz for the cushion layer are used which, with respect to their degree of basicity are not too far apart. This makes it possible to avoid a lowering of the melting point of the lining material brought about by the formation of a eutectic interphase.

In another embodiment of the invention, the lining is made of layers of a material having relatively good heat conduction properties in order to achieve a rapid cooling of the liquid melt. Further, for purposes of indirect induction fusion, at least one of the layers is of an electro-conductive material that can be inductively heated. Furthermore, a pourable material that solidifies like concrete and can be compacted by vibrating can be used for the manufacture of the contact layer.

The axes of the individual lining layers which, in their terminal state, have a hollow cylindrical shape, can run parallel to or along the furnace axis. Also, by means of an eccentric and/or oblique-angled arrangement, the contact layer can be additionally reinforced, for instance along the casting side. In order to achieve a reinforcement of individual, resistant layers in areas of greater wear, caused for instance by erosions or by the formation of scoria, the layers are preferably arranged in a stepwise ascending formation or the less resistant layers are interrupted. It is furthermore possible to arrange individual layers circumferentially likewise in stepwise formation, or else eccentrically with respect to one another, wherein all layers, with the exception of the contact layer, are interrupted circumferentially. If heat losses are to be kept at a minimum, at least one of the layers is made of a special material that is a good heat insulator.

These and other objects and advantages of the invention will become more apparent from the following detailed description and appended claims taken in conjunction with the accompanying drawings in which:

FIG. 5 illustrates a longitudinal cross-sectional view of a modified lining made in accordance with the invention;

FIG. 6 illustrates a view taken on line VI—VI of FIG. 5 of the offset layers of the lining;

FIG. 7 illustrates a longitudinal cross-sectional view of another modified lining made in accordance with the invention; and FIG. 8 illustrates a view taken on line VIII—VIII of FIG. 7 of a reinforced contact layer according to the invention.

For purposes of simplicity, like reference characters refer to like parts in the drawings.

Figure 1:
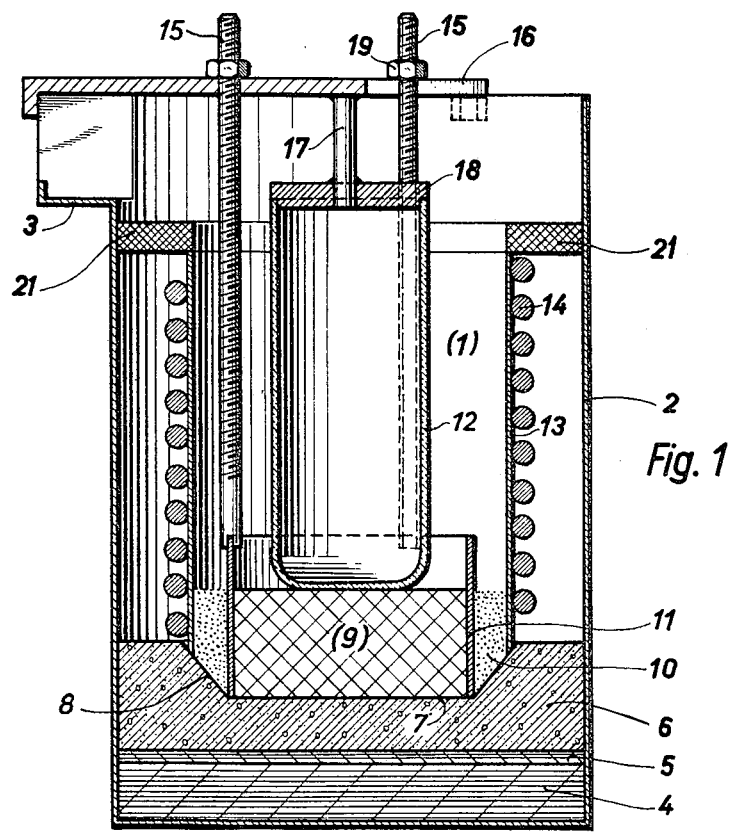
FIG. 1 illustrates a view taken on line I—I of FIG. 2 of an induction furnace to be lined in accordance with the invention.

Referring to FIG. 1, an induction furnace which is circular in shape has a hollow space 1 in which a two-part lining is to be made. The other housing 2 of the furnace surrounding the space 1 is made, for example, of steel and heat insulating plates and serves to maintain the various furnace parts in proper relationship. The upper end of the housing 2 has a spout-like attachment 3 on one side which is to provide for a discharge opening in the completed lining. The floor of the housing 2 is lined in a known manner with a layer 4 of refractory bricks and a layer 5 of heat insulation material, for example, asbestos, is applied over the brick layer 4. In addition, a layer 6 of refractory brick is placed over the heat insulating layer 5 and tamped in place by using granular or castable, e.g. concrete like, refractory material. A recess 7 with sloped or canted side walls 8 is provided centrally of the layer 6 and is sized to receive and center an adjustable separator wall 11. The separator wall is in the shape of a circular hollow cylinder and acts as a partition in the formation of the lining between a contact layer 9 and a cushion layer 10 of the lining. The portion of the contact layer 9 initially formed within the separator wall constitutes the lining floor and provides a base for supporting a negative mold 12. The negative mold 12 is sized to form a subsequent charge or melt receiving cavity in the furnace.

Alternatively, the cushion layer 10 can be formed on the layer 6 before the contact layer 9 is formed. Also, prior to insertion of the separator wall 11, layers of the material or materials used in the contact and cushion layers can be intitially arranged in the form of continuous layers.

An asbestos or cement insulation wall 13 secured to an induction coil 14 is positioned in spaced relation to the separator wall 11 and mold 12 in order to define the outer extremity of the lining and to support the material of the cushion layer 10 which, as shown, is filled to about ⅔ of the height of the separator wall 11. The space between the housing 2 and the induction coil 14 is closed off at the top by a ring 21 made of refractory material.

Figure 2:
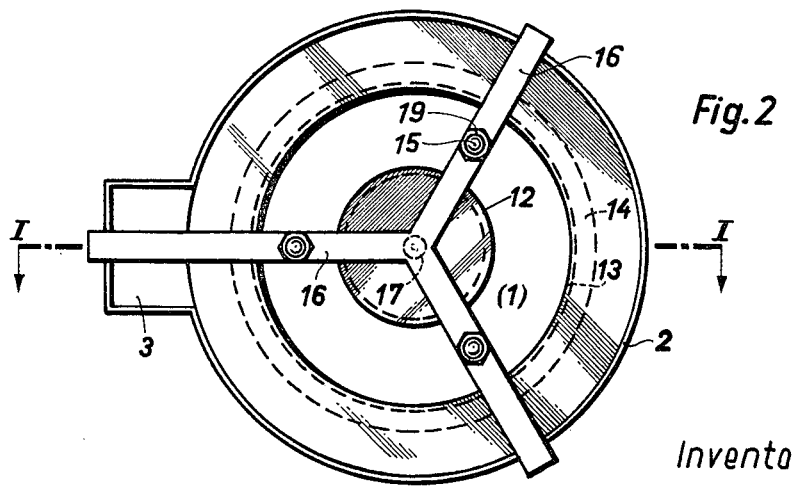
FIG. 2 illustrates a plan view of the furnace of FIG. 1.

Referring to FIGS. 1 and 2, in order to center the separator wall 11 and the mold 12 in the housing 2, a centering support 16 is fixedly mounted over the upper end of the housing 2 and connected to the separator wall 11 and mold 12. The centering support 16 which is, for example, of Y-shaped construction, has three lead screws 15 threadably guided therein which are secured to the upper end of the separator wall 1. These screws 15 upon rotation serve to move the separator wall 11 vertically up or down within the furnace relative to the negative mold 12. Nuts 19 are provided on the screws 15 to lock the screws 15 against downward movement. In addition, the centering support 16 has a depending rod-like attachment 17 at the center axis which coincides with the furnace axis. The rod-like attachment 17 projects into the melting space of the furnace and is secured to a centering plate 18 at the end. The centering plate 18 is loosely, i.e. removably, connected to the negative mold 12 in order to center and maintain the negative mold 12 in relation to the furnace.

Figure 3:
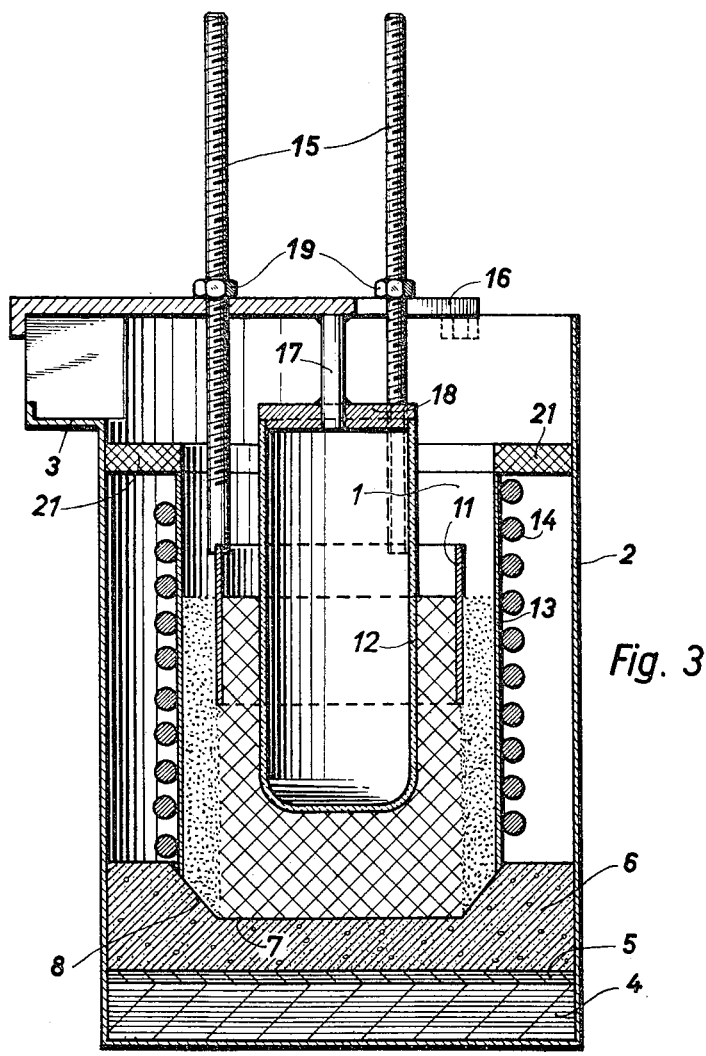
FIG. 3 illustrates a view similar to FIG. 1 of a partially completed lining of the invention.
Figure 4:
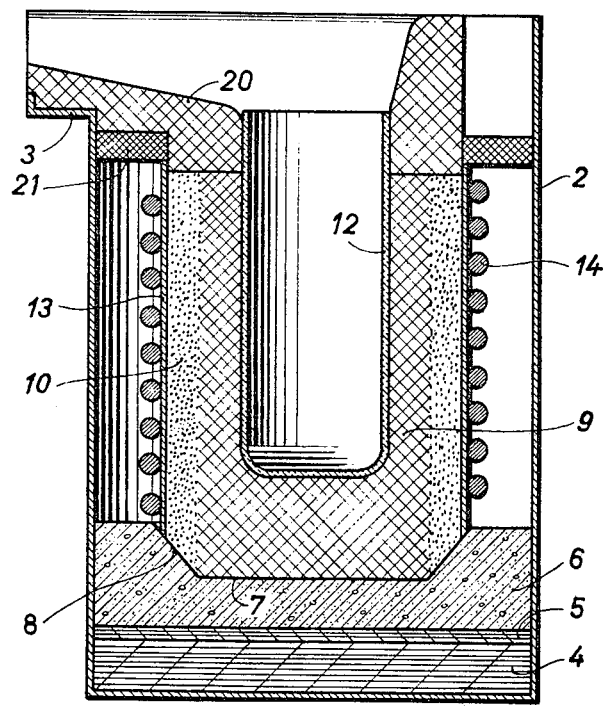
FIG. 4 illustrates a view similar to FIGS. 1 and 3 of a completed lining of the invention.

Referring to FIGS. 1, 3 and 4, the process of manufacturing a lining in the furnace is as follows: the material for the contact layer 9 is poured into the space within the separator wall 11 until the space is filled to about ¾ the height of the separator wall 11 and the material for the cushion layer 10 is poured into the space between the separator wall 11 and insulation wall 13 until filled to a similar extent. The two layers of material are then compacted as by shaking, tamping or vibration. Next, the separator wall 11 is pulled up by about ¼ of its height by means of the lead screws 15 and nuts 19. The layers of material are recompacted in order to close the gap between the layers resulting from the pulling up of the separator wall 11. More material is then poured onto the respective layers on opposite sides of the separator wall 11 to a height of about ¾ of the separator wall 11. The stepwise procedure of filling, compacting, pulling up and recompacting is repeated in sequence until the lining reaches the desired height at which the lining will not come into direct contact with the charge. Thereafter, a collar 20 is placed on the upper end of the lining. The collar 20 is of known construction, e.g. of refractory material or brick-layered stones bonded together with water glass or clay and forms a spout within the attachment 3 of the housing 2.

The material for the contact layer 9 consists, e.g. of foundry lime, aluminum oxide or zirconium oxide to which clay, SiAl ester or boric acid has been admixed as a sintering and/or binding agent. The material, on the other hand, for the cushion layer 10 consists either of the same material without any admixture of a sintering and/or binding agent or, e.g. magnesium oxide or chromium magnesite. That is the granular cushion layer material is of a higher refractoriness than the granular contact layer material and is such as not to sinter or form ceramic bonds between the grains at operating temperatures.

Alternatively, a pre-fabricated hollow body which is to remain within the lining can be used as a partition in lieu of the separator wall. In this case, the body is filled in layers along both sides with the two materials for the respective contact layer 9 and cushion layer 10 and the layers are compacted being individual filling phases.

Also, the lining can be built up with more than two layers of material, the individual layers being formed by the use of suitably shaped hollow bodies. For example, the contact layer can be made of foundry lime followed by a magnesite pipe as a prefabricated hollow body and followed, in turn, by an MgO layer as a pourable cushion layer. Layers having relatively good heat conduction properties can be built up of, e.g. MgO, silicon carbide or graphite grains; the graphite grains can also simultaneously serve as an electro-conductive layer for the indirect, inductive heating of the charge in the furnace. Materials suitable for heat insulating layers are, for instance, mica, asbestos, quartz, and zirconium oxide.

Referring to FIGS. 5 to 8, the contact layer 9 of the lining can be reinforced by modifying the design of the separator walls. For example, referring to FIG. 5 by using separator walls of different diameters in sequence, a step-like ascending arrangement of the layers of the lining is achieved in order to reinforce the individual layers in areas of greater wear. Referring to FIG. 6, by mounting the separator wall eccentrically to the furnace axis, the layers are arranged in eccentric relation to each other so that the contact layer 9 can be reinforced on the casting side of the furnace. Referring to FIGS. 7 and 8, by using a longitudinally corrugated separator wall, the contact layer 9 is corrugated on the outer surface such that various circumferentially spaced portions of the contact layer 9 are reinforced.

The annealing or sintering in of the lining as well as the melting itself occurs in per se known maner. Where the contact layer 9, as a result of an admixture of a binding agent, has a certain mechanical strength prior to sintering, the negative mold 12 is extracted prior to the first melt. Sintering will then occur simultaneously with the melting down of the initial charge. The same applies with regard to sintering in the case of linings in which the negative mold 12 is fused in together with the initial charge. As another possibility, the sintering can however be performed by means of an electro-conductive permanent mold consisting for instance of graphite, tungsten or molybdenium, prior to smelting of the initial melt.

What is claimed is:
1. A process for manufacturing a multi-layer lining for a melting furnace comprising the steps of
defining a first space between a negative mold and a separator wall,
defining a second space between the separator wall and an external wall surrounding said first space,
filling the said first space with a loose granular refractory material capable of being sintered at operating temperatures,
filling the said second space with a loose granular refractory material having higher refractoriness than the material in said first space, and that will not sinter or form bonds between the grains at operating temperatures,
compacting the material in each of said first and second spaces, and
subsequently heating the lining of the melting furnace to operating temperature to sinter only the materials in said first space.

2. A process as set forth in claim 1 wherein the materials in said first and second spaces are refilled and recompacted in a stepwise sequence.

3. A process as set forth in claim 2 wherein the separator wall is moved in an upward vertical direction after each compaction step and prior to each refilling step.

4. A process as set forth in claim 1 wherein said steps of filling and compacting are performed simultaneously.

5. A process as set forth in claim 1 wherein the material in said first space includes the same material as in said second space and an admixed sintering agent to reduce the refractoriness of the material in said first space to a point lower than the refractoriness of the material in said second space.

6. A process as set forth in claim 1 wherein the material in said first space includes an admixed binding agent.

References Cited
UNITED STATES PATENTS

| | | | |
|---|---|---|---|
| 832,895 | 10/1906 | Charles | 264—30 |
| 1,517,820 | 12/1924 | Bong | 264—30 |
| 1,917,849 | 7/1933 | Northrup | 264—30 |
| 2,141,600 | 12/1938 | Fisher | 264—30 |
| 3,122,813 | 3/1964 | Demaison | 264—30 |
| 3,252,199 | 5/1966 | Bossner | 264—34 |
| 3,345,059 | 10/1967 | Swindt | 266—43 |

JULIUS FROME, Primary Examiner

J. H. MILLER, Assistant Examiner

U.S. Cl. X.R.

264—34, 60; 266—43